United States Patent
Fuller et al.

(10) Patent No.: US 10,011,501 B1
(45) Date of Patent: *Jul. 3, 2018

(54) AUTOMATED WATER TREATMENT TRAILER FOR PROCESSING MULTIPLE FLUIDS SIMULTANEOUSLY

(71) Applicants: Burl Fuller, Midland, TX (US); Jerry Fuller, Midland, TX (US); Mark Clifton, Midland, TX (US); Jose Luna, Midland, TX (US); Jose Marquez, Midland, TX (US); Edy Redmon, Midland, TX (US)

(72) Inventors: Burl Fuller, Midland, TX (US); Jerry Fuller, Midland, TX (US); Mark Clifton, Midland, TX (US); Jose Luna, Midland, TX (US); Jose Marquez, Midland, TX (US); Edy Redmon, Midland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,630

(22) Filed: Nov. 21, 2017

Related U.S. Application Data (63) Continuation of application No. 15/661,548, filed on Jul. 27, 2017, now Pat. No. 9,834,452.
(Continued)

(51) Int. Cl.
*C02F 1/50* (2006.01)
*C02F 1/68* (2006.01)
(Continued)

(52) U.S. Cl.
CPC ............. *C02F 1/008* (2013.01); *B67D 7/74* (2013.01); *C02F 1/50* (2013.01); *C02F 1/685* (2013.01);
(Continued)

(58) Field of Classification Search
CPC ..... C02F 1/008; C02F 1/50; C02F 1/68; C02F 1/685; C02F 1/76; C02F 5/08; C02F 9/005; C02F 2209/40; C02F 2209/03; C02F 2201/002; C02F 2201/003; C02F 2201/005; C02F 2201/008; C02F 2201/009;
(Continued)

(56) References Cited

U.S. PATENT DOCUMENTS 3,291,308 A * 12/1966 Headrick ................ C02F 1/004
  210/101
5,547,584 A *  8/1996 Capehart ................ C02F 1/008
  210/241

(Continued)

*Primary Examiner* — Joseph Drodge
(74) *Attorney, Agent, or Firm* — Buskop Law Group, P.C.; Wendy Buskop (57) ABSTRACT

A secure automated water treatment trailer for inserting chemical in a pipeline, the trailer having a frame with at least one axle and a tongue, a base, a plurality of connected walls, a top engaging each of the plurality of connected walls opposite the base forming an enclosure, a door, a plurality of discharge ports, a plurality of suction ports, a controller in communication with each of the pumps and a network, a plurality of pressure measurement devices, a power supply, a plurality of valves, and a plurality of back pressure control regulators. The secure automated water treatment trailer automatically processes multiple fluids simultaneously into the pipeline. Each fluid has fluid characteristics and a specific gravity.

16 Claims, 8 Drawing Sheets

Related U.S. Application Data (60) Provisional application No. 62/491,024, filed on Apr. 27, 2017.

(51) Int. Cl.

| | | |
|---|---|---|
| *C02F 9/00* | (2006.01) | |
| *B67D 7/74* | (2010.01) | |
| *C02F 1/00* | (2006.01) | |
| *C02F 5/08* | (2006.01) | |
| *C02F 1/76* | (2006.01) | |

(52) U.S. Cl.
CPC ............. *C02F 1/76* (2013.01); *C02F 5/08* (2013.01); *C02F 9/005* (2013.01); *C02F 2201/008* (2013.01); *C02F 2209/03* (2013.01); *C02F 2209/40* (2013.01); *C02F 2303/04* (2013.01)

(58) Field of Classification Search
CPC .. C02F 2303/04; C02F 2303/08; C02F 1/686; C02F 9/00; B67D 7/28; B67D 7/302; B67D 7/74; B67D 7/741; B67D 7/743; B67D 7/76; B67D 7/78; B67D 7/84
USPC ...... 210/97, 134, 136, 137, 198.1, 241, 258, 210/749, 764; 222/22, 25, 52, 628, 129, 222/132, 135, 136, 145.1, 145.7, 145.8; 137/552, 613
See application file for complete search history.

(56) References Cited

U.S. PATENT DOCUMENTS

| | | | | |
|---|---|---|---|---|
| 5,632,892 | A * | 5/1997 | Klein | B01D 61/08 210/108 |
| 5,741,416 | A * | 4/1998 | Tempest, Jr. | C02F 1/008 210/192 |
| 8,404,113 | B2 * | 3/2013 | Shapiro | C02F 9/005 210/182 |
| 8,720,125 | B2 * | 5/2014 | Andretich | F24J 2/5264 296/171 |
| 9,834,452 | B1 * | 12/2017 | Fuller | C02F 1/008 |
| 2005/0016906 | A1 * | 1/2005 | Gettman | B01D 17/0202 210/143 |
| 2005/0083652 | A1 * | 4/2005 | Jairazbhoy | H01L 23/473 361/689 |
| 2006/0016825 | A1 * | 1/2006 | Bauch | B65G 33/04 221/124 |
| 2006/0113251 | A1 * | 6/2006 | McGuire | C02F 9/00 210/652 |
| 2011/0000861 | A1 * | 1/2011 | Hutchings | C02F 1/006 210/749 |
| 2011/0089123 | A1 * | 4/2011 | Kennedy | C02F 1/001 210/808 |
| 2013/0032540 | A1 * | 2/2013 | Acernese | B01D 61/025 210/652 |
| 2013/0098816 | A1 * | 4/2013 | Elfstrom | C02F 1/00 210/153 |
| 2013/0106191 | A1 * | 5/2013 | Iovino | H02J 4/00 307/72 |
| 2013/0142677 | A1 * | 6/2013 | Snyder | B01D 61/10 417/357 |
| 2014/0202565 | A1 * | 7/2014 | Bittner | C02F 1/006 137/561 R |
| 2016/0115062 | A1 * | 4/2016 | Krieger | C02F 9/00 210/241 |

* cited by examiner

AUTOMATED WATER TREATMENT TRAILER FOR PROCESSING MULTIPLE FLUIDS SIMULTANEOUSLY

CROSS REFERENCE TO RELATED APPLICATION

The current application is a continuation of U.S. Non-Provisional patent application Ser. No. 15/661,548 filed on Jul. 27, 2017, now U.S. Pat. No. 9,834,452, entitled "AUTOMATED WATER TREATMENT TRAILER FOR PROCESSING MULTIPLE FLUIDS SIMULTANEOUSLY" and claims priority to and the benefit of U.S. Provisional Patent Application Ser. No. 62/491,024 filed on Apr. 27, 2017, entitled "WATER TREATMENT TRAILER FOR AUTOMATICALLY PROCESSING MULTIPLE FUNDS SIMULTANEOUSLY". These references are hereby incorporated in its entirety.

FIELD

The present embodiment generally relates to an automated water treatment trailer for automatically processing multiple fluids simultaneously.

BACKGROUND

A need exists for a mobile system for processing multiple fluids simultaneously with fluid characteristics and specific gravity.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present invention relates to an automated water treatment trailer for automatically processing multiple fluids simultaneously wherein each fluid has fluid characteristics and specific gravity.

The automated water treatment trailer that is also a secure locking trailer contains a frame with at least one axle, a tongue for connecting the frame to a tow vehicle.

The automated water treatment trailer stops casualties of operators by providing a portable shelter for the operator from sun, hailstorms, sandstorms, and lightning while in the field.

The automated water treatment trailer contains all fluids inside the trailer so that should a leak occur, the fluid is contained in the trailer and does not contact the ground causing ground contamination. The automated water treatment trailer stops environmental hazards from happening to the earth.

The automated water treatment trailer provides a safer way to pump chlorine dioxide as a liquid, and not as a highly volatile gas, which is not only safer for the operators, and can prevent explosions proximate a well.

The automated water treatment trailer can also stop fires from occurring when gaseous chlorine dioxide is used, by simply having the chlorine dioxide as a liquid.

The automated water treatment trailer enables older workers to obtain shade and protection from the elements as they monitor the pumping process.

DETAILED DESCRIPTION

The invention relates to an automated water treatment trailer for processing multiple fluids simultaneously. Each fluid has a fluid characteristic and a specific gravity.

The automated water treatment trailer comprises a frame for connecting to a tow vehicle.

A base creating a floor is mounted to the frame.

A plurality of connected walls is mounted to the frame.

A top engages each of the plurality of connected walls opposite the frame forming an enclosure.

A door is mounted into one of the plurality of connected walls.

A plurality of discharge ports is mounted in one of the connected walls.

A plurality of suction ports, which are equal to the quantity of the plurality discharge ports, is mounted in one of the plurality of connected walls. Each suction port is connected to a chemical container, mounted on at least one adjacent structure for pulling chemicals from the chemical container.

At least one charging port is mounted in one of the plurality of connecting walls for charging a client device from inside or outside the enclosure, wherein the charging port connects to a power supply.

A plurality of pumps is mounted in the enclosure and connected in series. Each pump of the plurality of pumps is configured to pull chemical from a respective chemical container and flow the chemical to a respective one of the plurality of discharge ports simultaneously.

A controller is in communication with each pump of the plurality of pumps and a network to communicate with at least one client device for remote monitoring and control.

The automated water treatment trailer comprises a plurality of pressure measurement devices. Each pressure measurement device measures fluid flowing from a pump of the plurality of pumps. Each pressure measurement device is in communication with the controller.

A power supply is electrically connected to each of the plurality of pumps, the controller and the charging port.

The automated water treatment trailer comprises a plurality of valves. Each valve fluidly engages one suction port of the plurality of suction ports.

The automated water treatment trailer comprises a plurality of back pressure control regulators. Each back pressure control regulator is mounted to one of the valves, wherein the automated water treatment trailer is operable for automatically providing different fluid flows at remotely controllable pressures related to fluid characteristics and specific gravity and pressure in the water pipe.

In embodiments, the automated water treatment trailer cam comprise from three to five discharge ports for simultaneously engaging the water pipe.

A skid can be mounted in the enclosure for supporting the plurality of pumps above the frame.

In embodiments, each chemical container can comprise a container valve to control flow of chemicals from the chemical container to one of the pumps.

Each pump can comprise a pump motor, a pump controller with a display, and a plurality of control commands to regulate fluid flow through the pump.

The display can include an on off button, an increase flow button, a decrease flow button, and a settings selector.

The automated water treatment trailer can comprise a locking device connected to the door for securely locking the enclosure.

In embodiments, the automated water treatment trailer can comprise a surge protector mounted between the pump controller and the power supply.

The automated water treatment trailer can have an axle with a pair of wheels, and at least one brake mounted to the frame.

The automated water treatment trailer can have a plurality of lights mounted to the frame comprising: running lights, brake lights and turning lights, and fender lights.

In embodiments, the automated water treatment trailer can have clearance lights, security lights, and work lights mounted to the connecting walls.

The automated water treatment trailer can include a plurality of suction conduits each mounted between each chemical container and suction port.

The automated water treatment trailer can include a plurality of discharge conduits. Each discharge conduit can be mounted to one of the plurality of discharge ports.

In embodiments, the valves can comprise valves selected from the group consisting of a ball valve, a check valve, a butterfly valve, rotary valve, or a three way valve.

The following terms are used herein:

The term "automated" refers to a device that can run without human intervention other than start and stop.

The term "fluid" as used herein refers to liquid chemicals or combinations of liquid and particulate that remains flowable, or combinations of liquid and gas vapor, that remains flowable as a liquid.

The term "fluid characteristic" refers to a fluid temperature, a fluid volatility, a fluid reactivity at ambient temperatures, a fluid acidity, a fluid viscosity, fluid density, surface tension, and thermal conductivity.

The term "specific gravity" refers to the ratio of the density of a fluid to the density of a reference fluid; equivalently, it is the ratio of the mass of a fluid to the mass of a reference fluid for the same given volume. Apparent specific gravity is the ratio of the weight of a volume of the fluid to the weight of an equal volume of the reference fluid.

The term "trailer" refers to a portable, moveable structure that preferably has wheels and a towable tongue and optionally may have brakes, and lights.

Turning now to the Figures, FIGS. 1A-1D) depict the automated water treatment trailer 8 according to one or more embodiments.

The automated water treatment trailer 8 (shown in FIG. 1A) is connected to an adjacent structure 35, such as a secondary trailer for automatically processing multiple fluids simultaneously from a plurality of chemical containers 33a-33e contained in the adjacent structure.

Figure 1A:
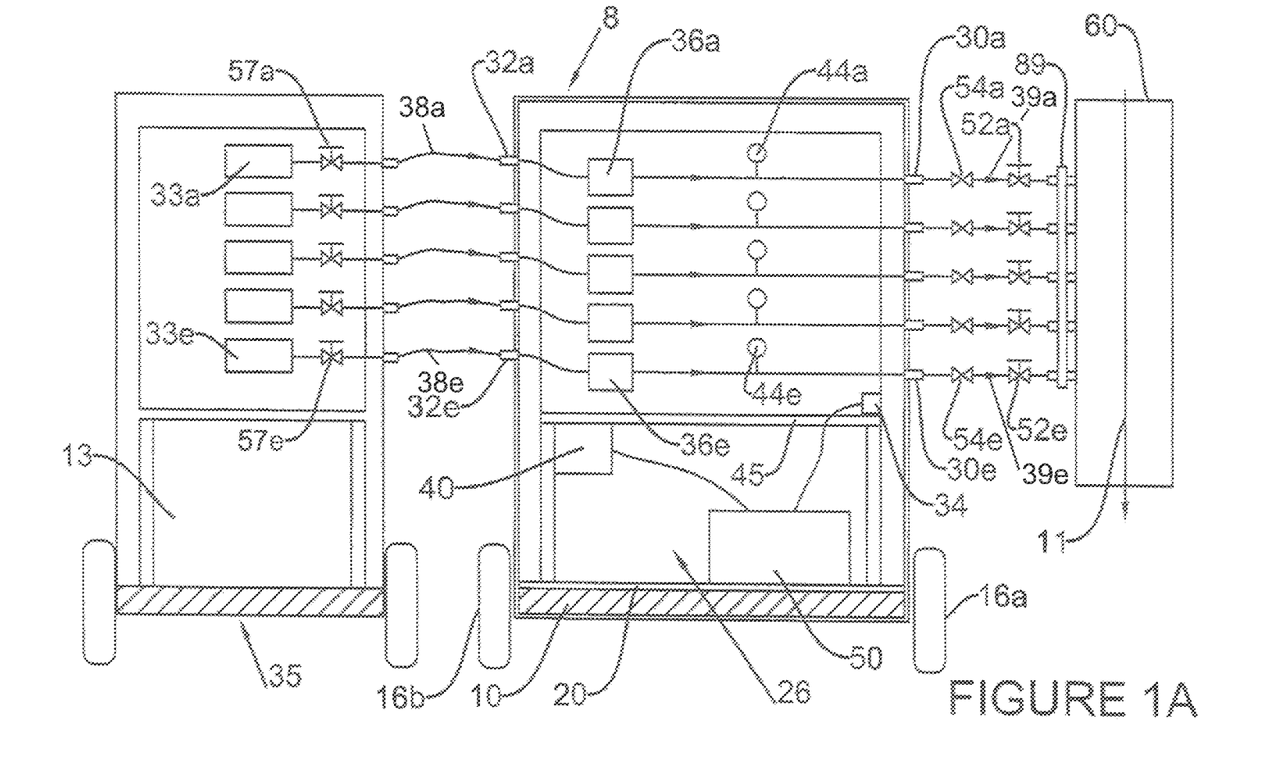
FIG. 1A depicts the back view of an automated water treatment trailer connected to an adjacent structure according to one or more embodiments.

In this embodiment, the additional structure 35 carries water 13 used for flushing the plurality of chemical containers 33a-33e.

Between the chemical containers 33a-33e and the automated water treatment trailer 8 are a plurality of chemical container valves 57a through 57e.

The automated water treatment trailer 8 sucks chemicals selectively from the chemical containers to treat fluid 11 in a water pipe 60.

Each fluid 11 in a water pipe 60 is treated with chemicals from the chemical containers 33a-33e using a model that utilizes fluid characteristics and specific gravity of the fluid 11 in the water pipe 60.

The automated water treatment trailer 8 is a secure locking trailer.

The automated water treatment trailer 8 has a frame 10. The frame can be eight feet wide by sixteen feet long. Each trailer is specifically designed to be towable without need for a road permit for extra wide or extra long loads. The frame 10 can range in width from 5 feet to 8 feet. The frame can range in length from 10 feet to 16 feet.

The frame can be made from channel steel. The frame 10 can be made from square tubing that can be from two inches to three inches in width and from two inches to three inches in height with a hollow center in some embodiments. In other embodiments, the square tubing can be solid. Components of the frame can be welded together in an embodiment, or can be clamped or screwed or riveted in other embodiments.

The frame 10 can be formed from channel steel.

The frame 10 is to be of a size that is street legal, and strong enough to be pulled by a tow vehicle without a permit.

At least one axle 12a is mounted to the frame 10 and supporting the frame. The at least one axle supports a pair of tires 16a, 16b.

Figure 1B:
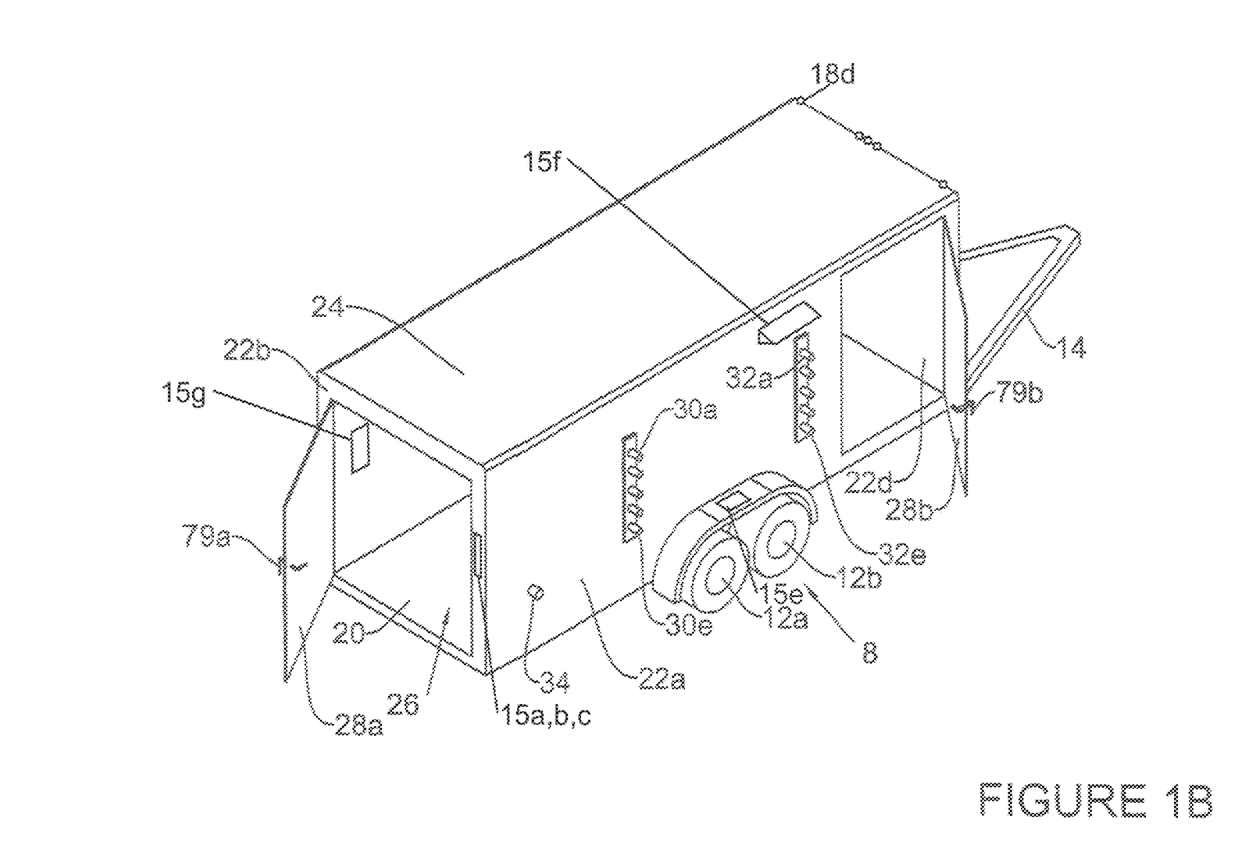
FIG. 1B shows a perspective view of the automated water treatment trailer according to one or more embodiments.
Figure 1C:
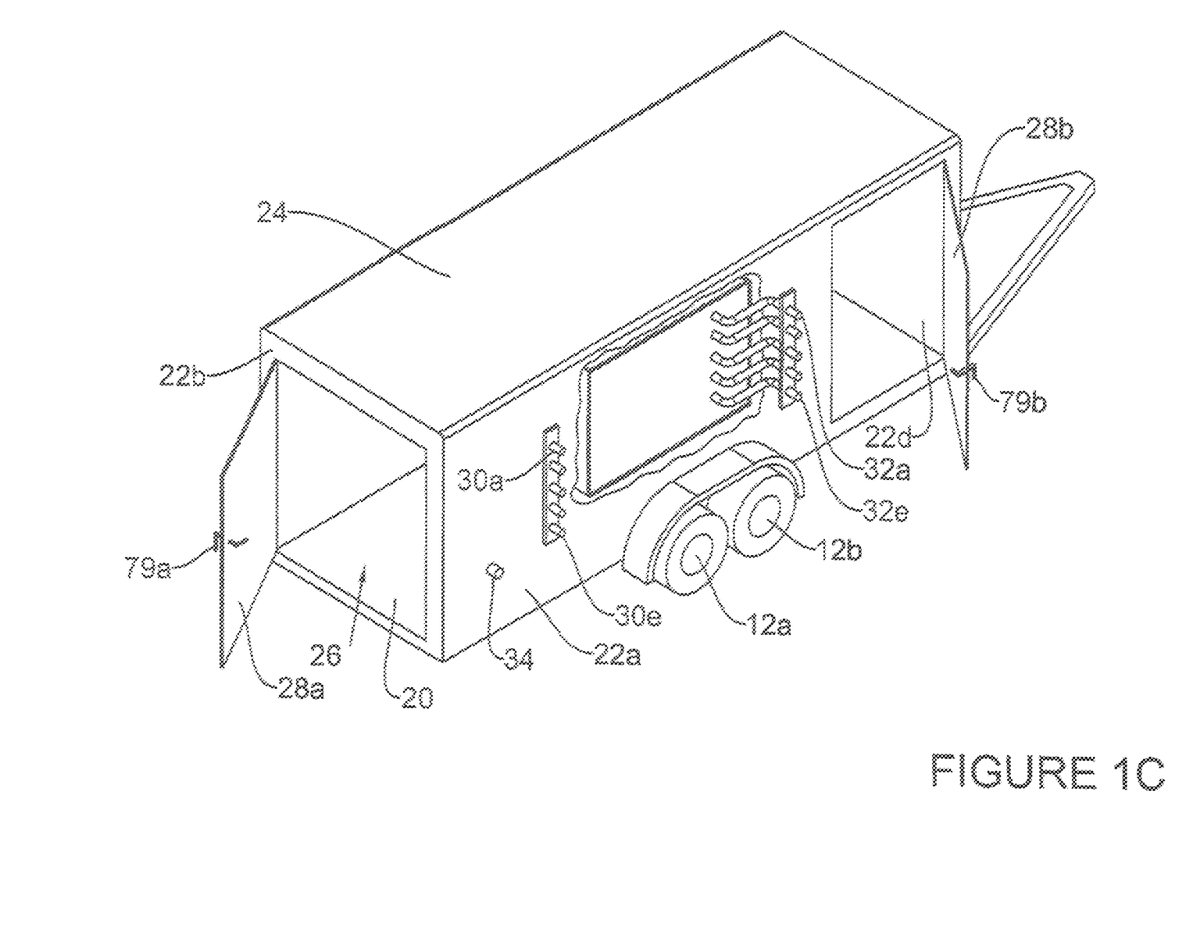
FIGS. 1C-1D depict another embodiment of the automated water treatment trailer.
Figure 1D:
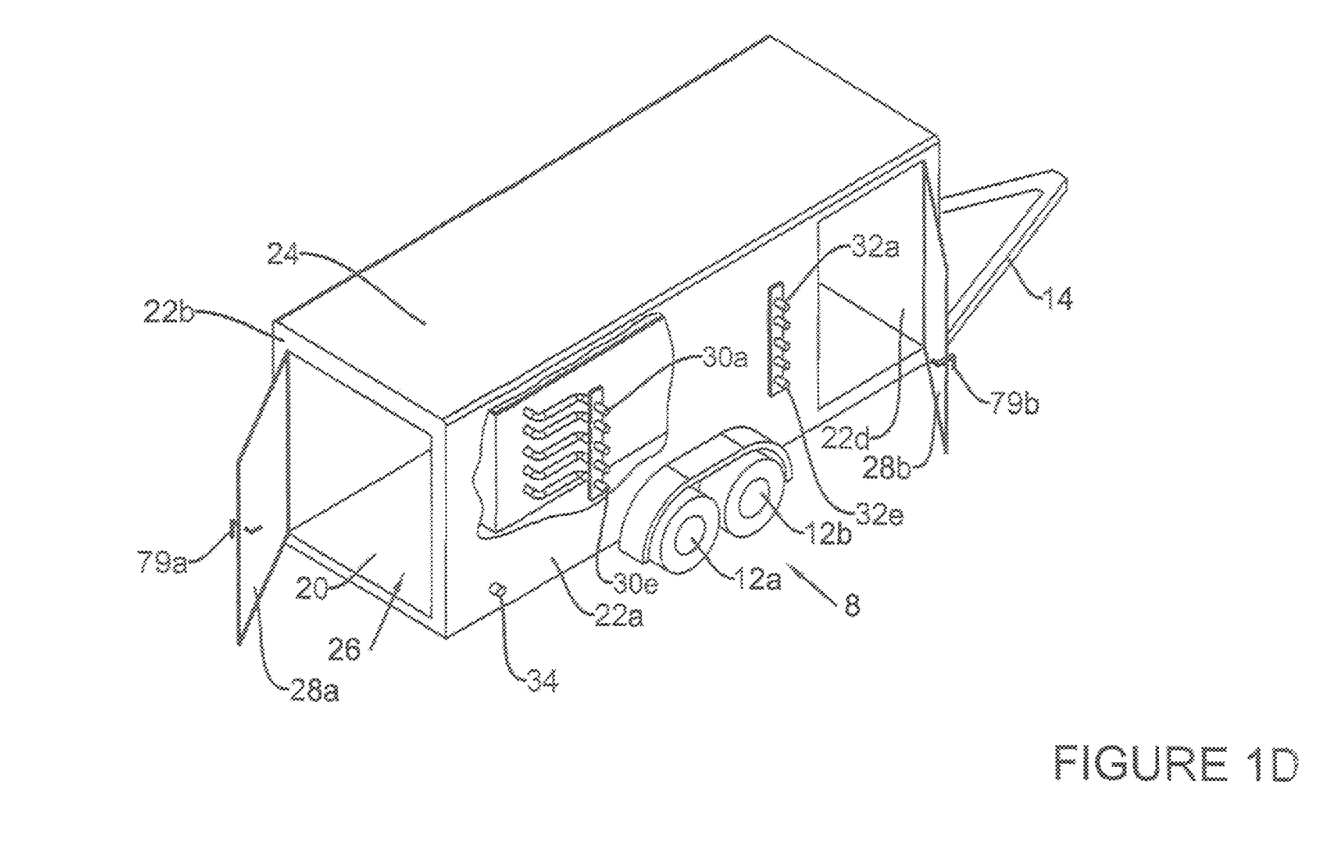

In embodiments, two axles 12a and 12b are depicted (see FIG. 1B). Each axle 12a and 12b has a pair of tires, with one tire mounted on either end of the axle.

The axles 12a and 12b can be of different sizes to support different weights applied to the frame.

In an example, an axle 12a can range in size from a single-axle to 6-axles, 13 feet 6 inches high, 53 feet 0 inches long.

Multiple axle trailers provide a greater weight capacity than a single axle trailers. In some cases, the trailers can have a tandem axle at the rear of the trailer. Axles are typically made from SAE grade 41xx steel The axles may have brakes 17, which can be actuated by the tow vehicle. The brakes can be for each wheel, or for pairs of wheels. The brakes can be pneumatic, hydraulic or electronic.

In embodiments, the automated water treatment trailer 8 with lights, which can be powered and actuated by the tow vehicle, including running lights 15*a*, brake lights 15*b*, and turning lights 15*c*. The trailer may have clearance lights 15*d*. The trailer may have fender lights 15*e*. The lights are typically powered by the prime mover hauling the trailer, but in some cases, there may be security lights 15*f* on the trailer run by the on-board power supply, which can be a generator to provide security to the trailer.

The frame has a tongue 14 for connecting the frame to the tow vehicle.

The tongue 14 can be triangular shaped.

The tongue 14 can be welded to the frame.

The tongue 14 can be made from channel steel or square tubing and can be powder coated or painted. The coating or paint can be a static charge resistant material, to prevent the attraction of lightening to the tongue. In embodiments, the entire trailer can be grounded and painted with a coating that reduces static charge build up.

The tow vehicle, which is also known as a "prime mover" can be a SUV, a pick up or a similar truck for towing. The tow vehicle can be a forklift. A bobtail is typically too large, instead a smaller all-terrain vehicles (ATV) can be used to tow the trailer to a remote site.

The automated water treatment trailer is designed to be lightweight for towing, so that an ATV does not need additional larger wheels, or a larger tread, or extra strong brakes to use while towing the trailer.

The overall automated water treatment trailer, without chemicals is contemplated to weight from one short ton to three short tons.

In embodiments, a base 20, creating a floor, can be mounted to the frame 10. Operators can stand on the base inside the trailer and monitor pumping.

The base 20 can be similar to a wall of a steel cage with a flooring material over the steel portions. An operator can safely stand on the flooring material, which can be plywood, or sheets of metal.

The base 20 can be the width of the trailer and the length of the trailer not including the tongue. In embodiments, the base can be shorter than the length of the trailer, enabling a power supply or generator to rest on the frame without being contained in the wall portion of the trailer.

In another embodiment, the base 20 can be welded over the frame.

The base 20 can be made from an explosion proof plate, such as steel plate with a thickness from one-half inch to one inch, and capable of sustaining a crash without deforming. Keeping the trailer lightweight is paramount, so keeping the base lightweight is also critical, hence a thickness of one inch or less.

The base 20, in still other embodiments, can be a rectangular frame made up of four base beams connected together with four attached side beams.

Each side beam could be attached to an intersection of two base beams at an angle of 90 degrees. Four beams connected in parallel to the base beams form a top, and the top is connected to each of the side beams forming a reinforced "cage" similar to a roll cage in race cars to protect the equipment inside the automated water treatment trailer in case of an accident.

In yet another embodiment, the base 20 can be a solid plate installed over the frame of the trailer, such as with bolts, enabling the top portions of the trailer to be removable and re-installable in a modular fashion depending on the needs of the customer.

The trailer has a plurality of connected walls 22*a*, 22*b*, and 22*d*. A fourth wall, 22*c* is not viewable in this Figure.

In embodiments, the connected walls 22*a*, 22*b*, and 22*d* can be mounted around the side beams of a base as described above.

The plurality of connected walls 22*a*, 22*b*, and 22*d* is solid. In embodiments, the plurality of connected walls 22*a*, 22*b*, and 22*d* can be made from plywood. Each wall can be the same height. It is contemplated that the walls can range in height from 6 feet to 8 feet, such as 7 feet in height.

However, in embodiments, the front wall may be a stepped configuration, providing an extension for protection, over a power supply or generator mounted external of the wall, and simultaneously providing a storage area above the generator or power supply for spare parts and tools.

The trailer has a weatherproof top 24 engaging each of the plurality of connected walls opposite the base forming an enclosure 26.

The weatherproof top 24 can be made from a solid material, such as sheet metal, wood, or a lightweight strong non-deforming polymer plastic, such polyvinyl chloride.

In another embodiment, the weatherproof top 24 can be made from ballistic material, such as ballistic grade tent material, to reduce weight of the trailer while preventing rocks and other debris from entering the enclosure.

The thickness of the weatherproof top 24 if made from a solid material is from one-fourth inch to one-half inch.

The weatherproof top 24 can be further coated with a white sealant to not only reflect heat but also provide a weathertight seal with the walls.

In embodiments, two locking doors 28*a* and 28*b* are formed in the connected walls.

The locking doors can have locking devices 79*a* and 79*b*. The locking devices can be a latch with padlock.

The locking doors 28*a* and 28*b* can be hinged, or a sliding barn-like door, and can be a metal hollow reinforced door.

In another embodiment, the locking doors 28*a* and 28*b* can be a rolling hurricane shutter that rolls up and down, and collapses into a case. The door embodiment can provide an additional lightweight feature.

The hurricane shutter embodiments, provides enormous security to equipment in the trailer when used with a solid weatherproof top. In this embodiment, the trailer can withstand up to a category 1 hurricane winds without deforming, provided the trailer is tied down securely and does not roll away.

A plurality of discharge ports 30*a*-30*e* and a plurality of suction ports 32*a*-32*e* can be mounted in the same connected wall.

The suction ports 32*a*-32*e* can be mounted on a different connected wall opposite the discharge ports 30*a*-30*e*.

In another embodiment, the suction ports and the discharge ports can be mounted to the same connected wall (see FIG. 1B).

The quantity of discharge ports 30*a*-30*e* equals the quantity of suction ports 32*a*-32*e*.

Each discharge port 30*a* can have a diameter from 0.25 inch to 1 inch, such as 0.5 inch.

Each suction port 32*a* is connected through the walls. Each suction port 32*a* can have a diameter from one-fourth inch to two inches, such as one inch.

The discharge ports 30*a*-30*e* and the suction ports 32*a*-32*e* can be threaded on an inner diameter of each port.

A hose fitting threads to each of the discharge ports 30*a*-30*e* and suction ports 32*a*-32*e*. The hose fitting threads engage a conduit that flows, in the case of the suction ports, from a chemical container mounted on an adjacent structure. The conduit, in the case of the discharge port, connects to a manifold 89 that is mounted on a water pipe.

Each suction port 32a is connected to one of the chemical containers 33a-33e mounted on an adjacent structure 35, which is shown to be a trailer (see FIG. 1A), but could be a skid mounted unit.

A suction conduit 38a-38e is mounted between each chemical container 33a-33e and suction port. A discharge conduit 39a-39e is mounted between each discharge port 30a-30e and the manifold 89.

The suction conduit 30a can be made from a flexible chemical hose, having an inner diameter between one-half inch and three inches.

The plurality of chemical containers 33a-33e is used for supplying chemical to the manifold 89.

For example, the chemical containers 33a-33e can include biocides, such as glutaraldehyde, sold under the brand name GLUTARAL™ among others, and acting as a disinfectant. The biocide is applied as a liquid.

Glutaraldehyde is effective against a range of microorganisms including spores.

From 25 parts per million to 300 parts per million of the biocide can be used based on the total amount of the final formulation going into the manifold.

In embodiments, other chemical containers include a scale inhibitor, such as phosphonic scale inhibitors made by Performance Chemical Company of Midland, Tex. under brand number PH-322™.

From 50 parts per million to 500 parts per million of the scale inhibitor can be used based on the total amount of the final formulation going into the manifold scale inhibitor.

In embodiments, other chemical containers include a stabilized chlorine dioxide in liquid form.

The stabilized chlorine dioxide would be used in amount from 25 ppm to 500 ppm based on the total amount of the final formulation going into the manifold.

Still other chemical containers may include corrosion inhibitors, paraffin inhibitors, clay stabilizers, hydrogen sulfide scavengers and antioxidants.

The manifold that is mounted to the water pipe and in fluid connection with the discharge ports 30a-30e, which can allows from two to five injection points into the manifold 89.

The manifold 89 can be made from 10 inch steel pipe.

The flow rate through the manifold 89 can range from one-half barrels per minute to 100 barrels per minute.

In embodiments, the automated water treatment trailer 8 has a charging port 34 mounted in one of the connecting walls for providing energy to a removable client device, such as a cell phone, a laptop or similar device. The charging port 34 can charge portable devices, such as a 110-volt connection and can charge devices with a USB connection. Multiple charging ports can be used for operators to charge their laptops and cell phones simultaneously, particularly in case of emergency, allowing continuous connectivity to a home office.

The charging port 34 can connect to the onboard power supply 50, which can be a battery bank recharged by a solar cell array.

In another embodiment, the charging port 34 can be external to the trailer.

On top of the base 20 or the frame if no base is used, a skid 45 is installed, which can be in the shape of a table or L-shaped structure for supporting machines contained in the enclosure 26. The skid 45 can be removably fastened in the enclosure 26. The skid can be made from steel.

In embodiments, a plurality of pumps 36a-36e can be installed over the skid 45.

The plurality of pumps can be connected in parallel to each other each receiving chemicals from a different chemical container of the adjacent structure 35.

In embodiments, the trailer and the plurality of pumps 36a-36e are electrically connected to a power supply 50.

The pumping rate of each pump 36a-36e can range from 0.5 gallons per hour to 250 gallons per hour. In embodiments, the pumps 36a-36e can be remotely controlled by connecting to a cell phone of an operator. In another embodiment, the pumps can be remotely controlled by a wired pendant station, with on, off, and an ability to increase or reduce flow rates by an operator.

A controller 40 is installed in the automated water treatment trailer that is in communication with each of the pumps 36a-36e.

In embodiments, the pumps 36a-36e, controller 40 and the charging port 34 can connect to the power supply 50. The power supply can be a generator, such as a gas generator.

Also, the power supply 50 can be another portable power supply such as solar cells mounted to the outside of the enclosure connected to a battery bank mounted inside the automated water treatment trailer.

Connected to each pump 36a-36e is a pressure measurement device 44a-44e.

The pressure measurement devices 44a-44e can measure from one psi to 350 psi as the pumps move the chemicals to the discharge port.

Exemplary pressure measurement devices 44a-44e can be made by Prominent Pumps of Pittsburgh, Pa.

Each pressure measurement device 44a-44e measures discharge fluid flowing from the plurality of pumps.

In embodiments, the manifold 89 can be connected a plurality of valves 52a-52e that connects to discharge ports 30a-30e. Each valve 52a-52e is fluidly connected to one of the plurality of discharge port.

Each valve 52a-52e can connect to one of a plurality of back pressure control regulators 54a-54e.

In an embodiment, the valve 52a-52e can be a ball valve, a check valve, a butterfly valve, a rotary valve or a three way valve.

Each back pressure control regulator 54a-54e is mounted between one of the valves and a suction port.

The automated water treatment trailer connects between a discharge fluid source and a water pipe to automatically provide different fluid flows at remotely controllable pressures using fluid characteristics and specific gravity and pressure in the water pipe.

Figure 2A:
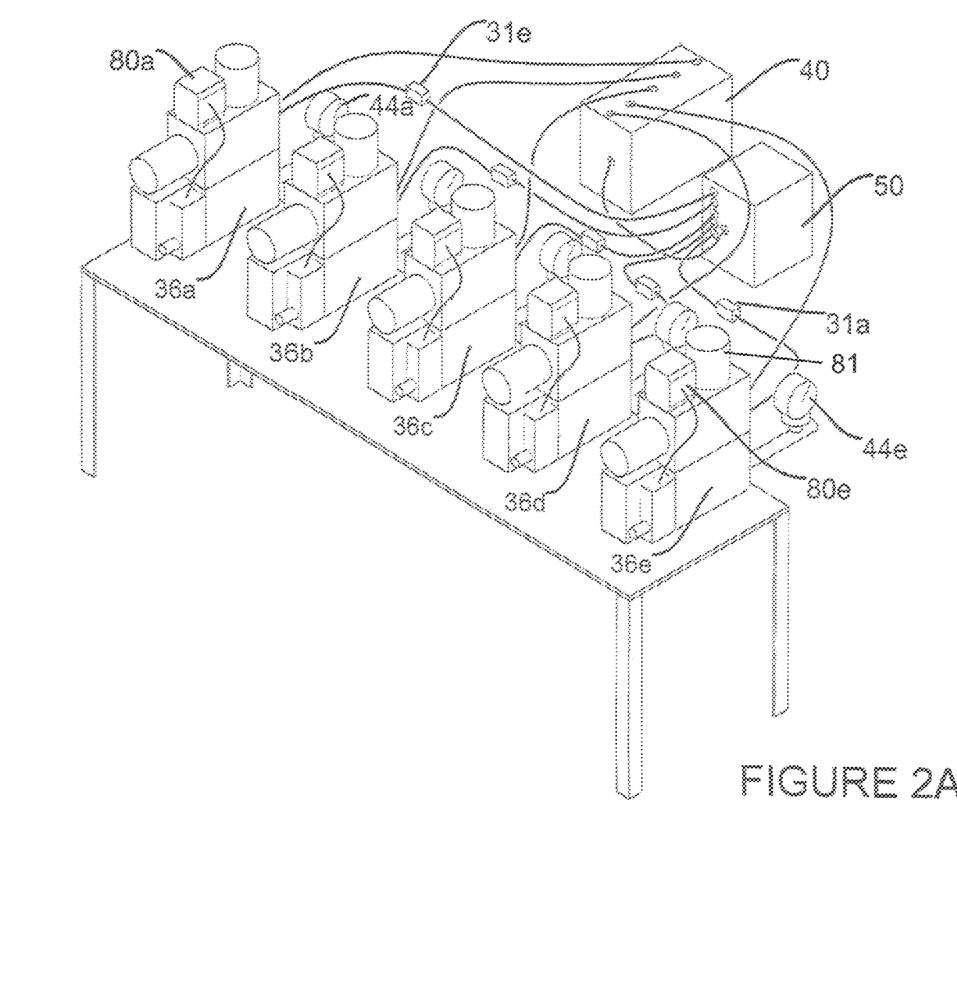
FIG. 2A depicts a detail of the plurality of pumps connected to the controller according to one or more embodiments

FIG. 2A depicts a detail of the plurality of pumps connected to the controller which are mounted inside the trailer.

The plurality of pumps 36a-36e are connected in parallel and in this embodiment shown mounted to a skid.

In embodiments, a controller 40 is in communication with each of the pumps and further in communication bidirectionally with a network.

The controller 40 and the pumps 36a-36e are electrically connected to a power supply 50 which can be a diesel generator.

In embodiments, each pump 36a-36e is connected to a plurality of pressure measurement devices 44a-44e.

Each pump 36a-36e can have a separate pump controller 80a-80e.

The power supply 50 may connect to a plurality of surge protectors 31a-31e. The surge protectors 31a-31e can protect each pump.

The surge protector can be a General Electric surge protector for AC power surges.

Figure 2B:
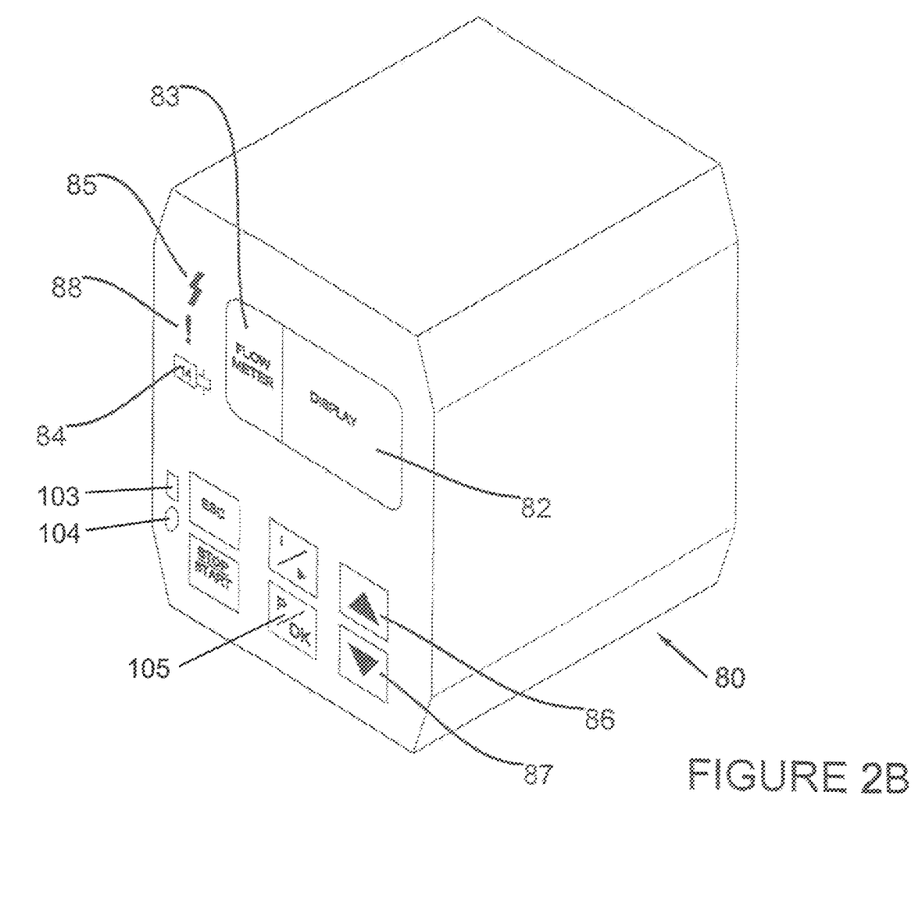
FIG. 2B depicts a detail of a pump controller according to one or more embodiments.

FIG. 2B depicts a detail of a pump controller 80.

The pump controller 80 contains a display 82, a flow meter, 83, a pump stroke counter 84 (showing 14 strokes have been counted), a power indicator 85 which can be a light that is on, when the pump is on, an increase flow button 86, a decrease flow button 87, and an alarm indicator 88 which indicates when the pump is operating less than or greater than preset limits. The alarm indicator can be a light.

The display 82 can be a touch screen display.

The flow meter 83 quantifies bulk fluid movement. Fluid flow can be measured in a variety of ways. Positive-displacement flow meters accumulate a fixed volume of fluid and then count the number of times the volume is filled to measure flow. Other flow measurement methods rely on forces produced by the flowing stream as it overcomes a known constriction, to indirectly calculate flow. Both types of flow meters can used herein. Flow may be measured by measuring the velocity of fluid over a known area.

The pump rate of flow may be modified using the formula to convert Barrels per minute and ppm to Gallons per hour to adjust flow rate on the pump display. The formula, which is GPH=(bbls/min)*42*ppm/1000000*60 establishes the correct rate to set the pump. Stroke length and stroke time also need to be set to precisely measure the correct amount of chemical/fluid pumped.

Figure 3:
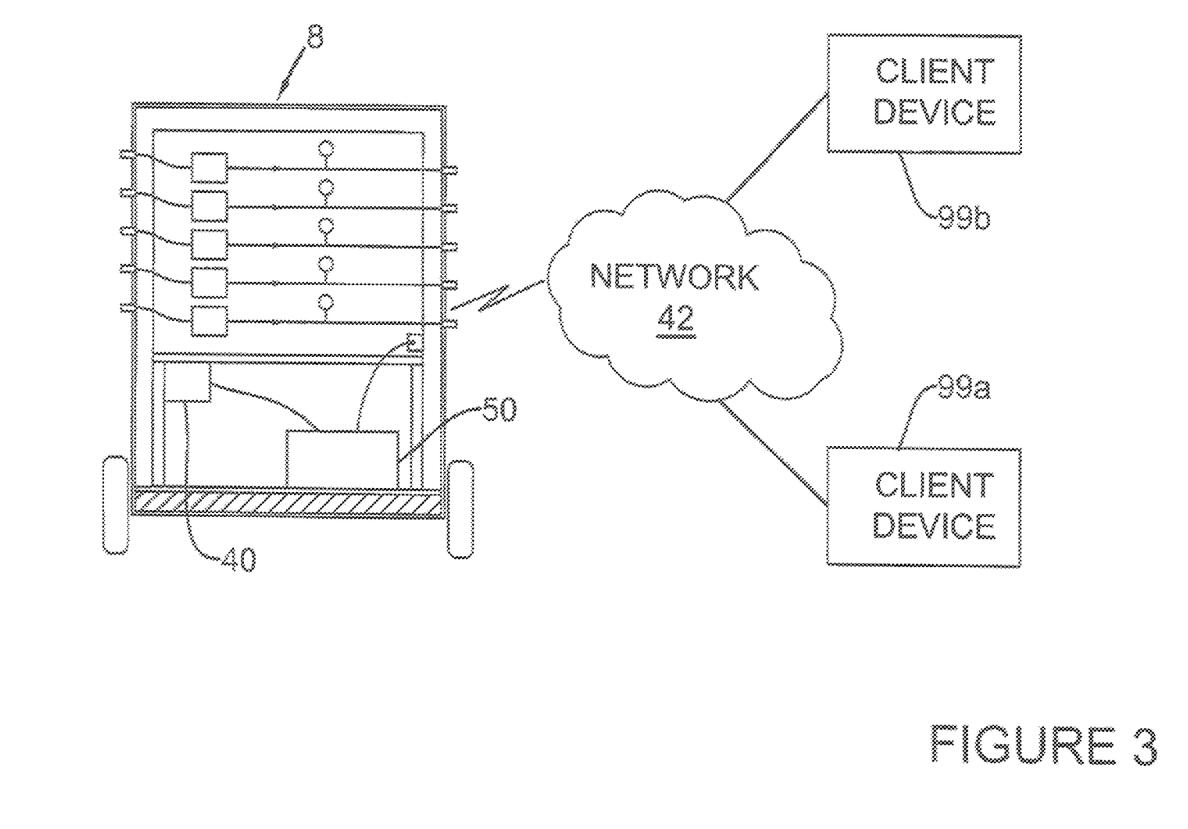
FIG. 3 depicts a diagram of the trailer connected to a network for remote control of the trailer from client devices according to one or more embodiments.

FIG. 3 depicts a diagram of the automated water treatment trailer 8 with a controller 40 powered by a power supply 50 in wireless communication with the network 42 for remote control of the trailer from client devices 99a and 99b.

The controller can further communicate with a network that further communicates with a plurality of client devices 99a and 99b for remote control, all simultaneously.

The client device 99a can be a laptop, a cell phone, a cloud based processor, a tablet, or another wearable computer.

The controller 40 can be a programmable logic circuit, or a laptop, or another portable processing device that has processor in communication with data storage that is a computer readable device with non-evanescent memory, and a display.

The controller 40 provides bidirectional communication with a network.

The network 42 can be a satellite network, a global communication network, or a cellular network.

Figure 4:
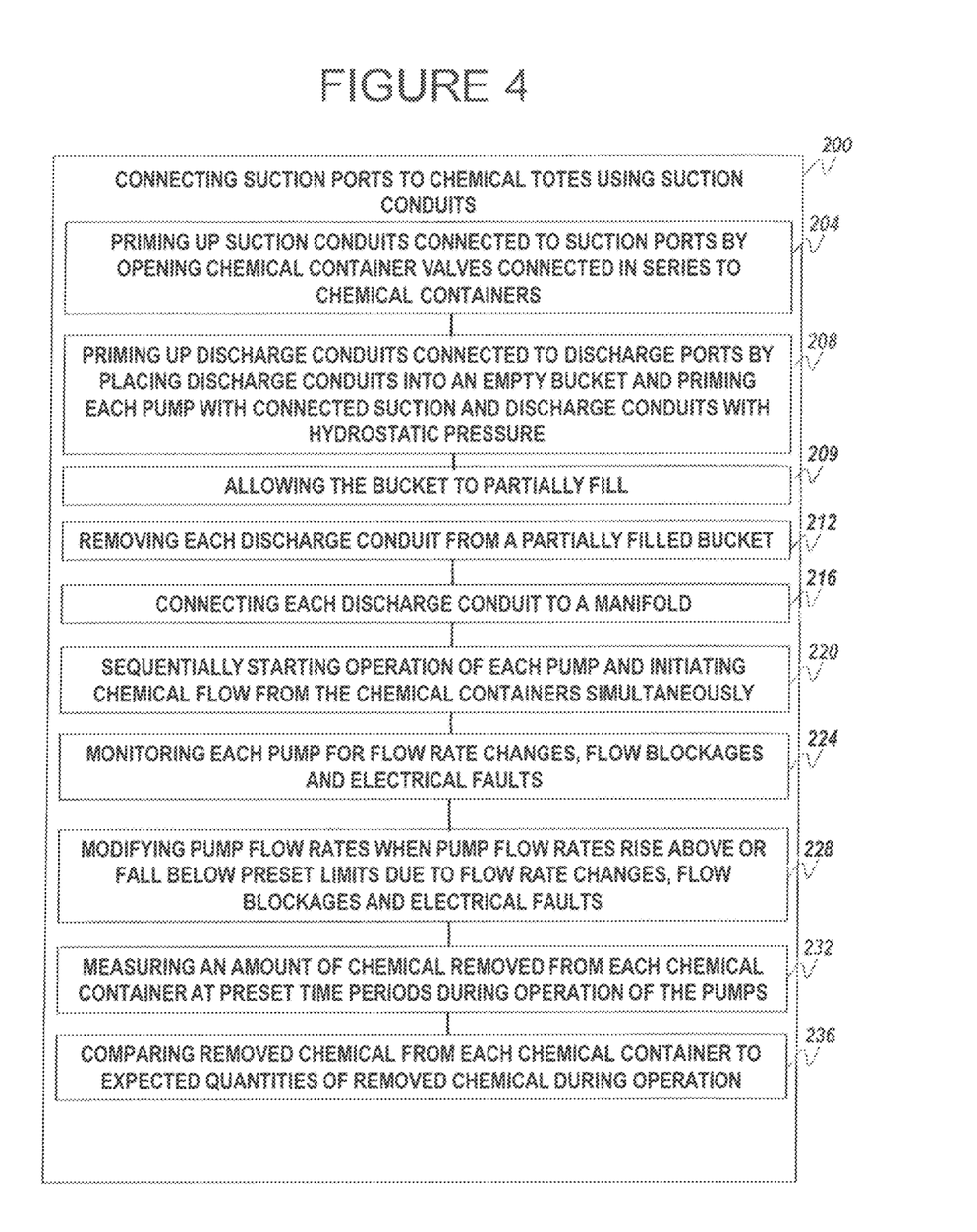
FIG. 4 is a diagram of the steps of a method according to an embodiment.

FIG. 4 is a diagram of the steps of a method according to one or more embodiments.

The following is an exemplary method for automated treatment of water in a pipeline.

The method for automated treatment of water in a pipeline can include, but is not limited to the steps described below. The method can be utilized by a person of ordinary skill in the industry, and is not limited to a particular order or sequence.

The method involves connecting suction ports to chemical containers using suction conduits, as shown in box 200.

The method involves priming up suction conduits connected to suction ports by opening chemical container valves connected in series to chemical containers, as shown in box 204.

The method involves priming up discharge conduits connected to discharge ports by placing discharge conduits into an empty bucket and priming each pump with connected suction and discharge conduits with hydrostatic pressure, as shown in box 208.

The method involves allowing the bucket to partially fill, as shown in box 209.

The method involves removing each discharge conduit from a partially filled bucket, as shown in box 212.

The method involves connecting each discharge conduit to a manifold, as shown in box 216.

The method involves sequentially starting operation of each pump and initiating chemical flow from the chemical containers simultaneously, as shown in box 220.

The method involves monitoring each pump for flow rate changes, flow blockages and electrical faults as shown in box 224.

The method involves modifying pump flow rates when pump flow rates rise above or fall below preset limits due to flow rate changes, flow blockages and electrical faults, as shown in box 228.

The method involves measuring an amount of chemical removed from each chemical container at preset time periods during operation of the pumps, as shown in box 232.

The method involves comparing removed chemical from each chemical container to expected quantities of removed chemical during operation, as shown in box 236.

EXAMPLE—METHOD FOR USING AN AUTOMATED WATER TREATMENT TRAILER AND PROCESSING MULTIPLE FLUIDS SIMULTANEOUSLY

For two fluids. The first fluid is a biocide.

The second fluid is stabilized chlorine dioxide.

The automated water treatment trailer is an 8 foot by 16 foot frame with two axles, with two tires per axle, a 3 foot long tongue for connecting the frame to a Ford F 150 pick up truck.

A base is mounted on the frame and is made from plywood creating a floor.

Four connected walls are mounted around the entire base.

A weatherproof top engages each of the plurality of connected walls opposite the base forming an enclosure that is 8 feet wide by 16 feet long by 7 feet high.

Two locking doors are used with the enclosure.

A first locking door can be mounted into the wall at the back of the automated water treatment trailer. The first door can be 6.5 feet high and 7.5 feet wide. The first locking door is hinged.

The second locking door can be mounted in a side-connected wall. The second locking door can be 6.5 feet high and 4 feet wide.

Two discharge ports 30a-30b are mounted in the same connected wall as the second door.

Two suction ports 32a-32b are mounted in same connected wall.

Each suction port connects to a chemical container mounted on at least one adjacent structure. The suction port pulls chemicals from the chemical container. One suction ports can connect to chlorine dioxide chemical containers and two suction ports can connect to biocide chemical containers.

A manifold is mounted to a water pipe and in fluid connection with two discharge ports. The manifold is configured to control flow fluid from the two discharge ports into a water pipe.

A charging port 34 is mounted in one of the connecting walls for charging simultaneously, two client devices from outside the enclosure.

Two pumps mounted in the enclosure and connected in parallel, pull chemical from the chemical containers and flow the chemical to the plurality of discharge ports simultaneously.

A controller that is a computer is in communication with each of the pumps and with a network, which in this example, is the Internet to communicate with at least one client device for remote monitoring and control.

Two pressure measurement devices are used to measure pressure on fluid flowing from each pump. Each pressure measurement device is in communication with the controller.

A power supply that is a generator that generates AC 110 volt current electrically connects to each of the pumps, as well as the controller and the charging port.

Two valves, which in this case are ball valves, are used. Each valve fluidly engages one of the plurality of discharge ports.

Two back pressure control regulators are used in this example. Each back pressure control regulator is mounted to one of the ball valves.

The automated water treatment trailer automatically provides the two different fluids at different flows by remote control and preset pressures that relate to fluid characteristics and specific gravities as well as pressure in the water pipe.

While these embodiments have been described with emphasis on the embodiments, it should be understood that within the scope of the appended claims, the embodiments might be practiced other than as specifically described herein.

What is claimed is:

1. An automated water treatment trailer for processing multiple fluids simultaneously, each fluid with a fluid characteristic and a specific gravity, the automated water treatment trailer comprising:
   a. a frame for connecting to a tow vehicle;
   b. a plurality of connected walls mounted to the frame;
   c. a top engaging each of the plurality of connected walls opposite the frame forming an enclosure;
   d. a door mounted into one of the plurality of connected walls;
   e. a plurality of discharge ports mounted in one of the connected walls;
   f. a plurality of suction ports equal to the quantity of the plurality discharge ports mounted in one of the plurality of connected walls, each suction port connected to a respective chemical container of a plurality of chemical containers mounted on at least one adjacent structure of the automated water treatment trailer, the suction ports configured for pulling chemicals from one of the chemical containers;
   g. a plurality of pumps mounted in the enclosure and connected in at least one of series or parallel, each pump of the plurality of pumps configured to pull chemical from the respective chemical container of the plurality of chemical containers and flowing the chemical to a respective one of the plurality of discharge ports simultaneously;
   h. a controller in communication with each pump of the plurality of pumps, wherein the controller is configured to connect to a network to communicate with at least one client device for remote monitoring and control;
   i. a plurality of pressure measurement devices, each pressure measurement device measuring fluid flowing from a pump of the plurality of pumps, each pressure measurement device in communication with the controller;
   j. a power supply electrically connected to each of the plurality of pumps, and the controller;
   k. a plurality of valves; each valve fluidly engaging a respective one of the plurality of discharge ports; and
   l. a plurality of back pressure control regulators, each back pressure control regulator mounted to a respective one of the valves, wherein the automated water treatment trailer is operable for automatically providing different fluid flows at remotely controllable pressures related to fluid characteristics and specific gravity and pressure in a water pipe.

2. The automated water treatment trailer of claim 1, the plurality of discharge ports comprising comprising from three to five discharge ports for simultaneously engaging the water pipe.

3. The automated water treatment trailer of claim 1, comprising a skid mounted in the enclosure for supporting the plurality of pumps above the frame.

4. The automated water treatment trailer of claim 1, wherein each chemical container comprises: a container valve to control flow of chemicals from each chemical container to one of the respective pumps.

5. The automated water treatment trailer of claim 1, wherein each pump comprises: a pump motor, a pump controller with a display, and a plurality of control commands in the pump controller to regulate fluid flow through the pump.

6. The automated water treatment trailer of claim 5, wherein the display comprises: a start button, a stop button, an increase flow button, a decrease flow button, an alarm indicator, and a settings selector.

7. The automated water treatment trailer of claim 5 comprises a surge protector mounted between the pump controller and the power supply.

8. The automated water treatment trailer of claim 1 comprises a locking device connected to the door for securely locking the enclosure.

9. The automated water treatment trailer of claim 1 comprises an axle with a pair of tires, and at least one brake mounted to the frame.

10. The automated water treatment trailer of claim 1 comprises a plurality of lights mounted to the frame selected from the group consisting of: running lights, brake lights, turning lights, and fender lights.

11. The automated water treatment trailer of claim 1, comprising: clearance lights, security lights, and work lights mounted to the connecting walls.

12. The automated water treatment trailer of claim 1, comprising a suction conduit mounted between each chemical container and respective suction port.

13. The automated water treatment trailer of claim 1 comprises a plurality of discharge conduits, each discharge conduit mounted to a respective one of the plurality of discharge ports.

14. The automated water treatment trailer of claim 1, wherein the valves comprise: valves selected from the group consisting of a ball valve, a check valve, a butterfly valve, rotary valve, or a three way valve.

15. The automated water treatment trailer of claim 1 comprises at least one charging port mounted in one of the plurality of connecting walls for charging a client device from inside or outside the enclosure, wherein the charging port is configured to connect to a power supply.

16. The automated water treatment trailer of claim 1, comprising a base, creating a floor, mounted to the frame.

\* \* \* \* \*